Figure 1:
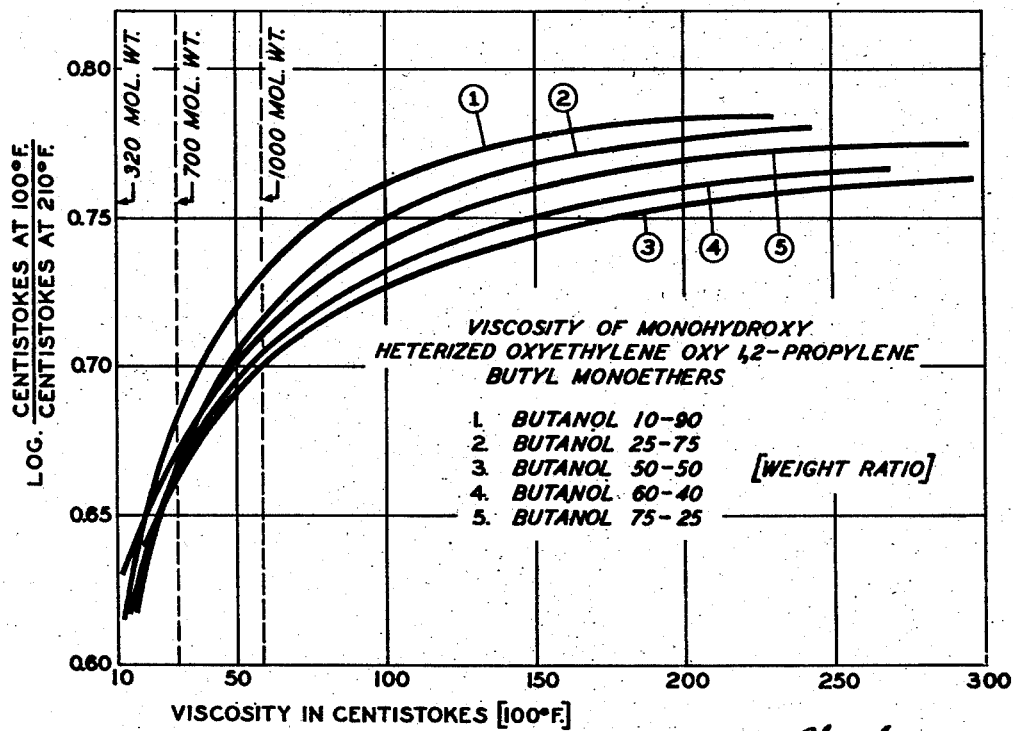

INVENTORS
FREDERICK H. ROBERTS
HARVEY R. FIFE
BY
ATTORNEY

Patented Aug. 19, 1947

2,425,755

UNITED STATES PATENT OFFICE 2,425,755

MIXTURES OF POLYOXYALKYLENE MONO-HYDROXY COMPOUNDS AND METHODS OF MAKING SUCH MIXTURES

Frederick H. Roberts, Charleston, W. Va., and Harvey R. Fife, Mount Lebanon, Pa., assignors to Carbide and Carbon Chemicals Corporation, a corporation of New York Application June 1, 1944, Serial No. 538,340

18 Claims. (Cl. 260—615)

This invention relates to mixtures of polyoxyalkylene monohydroxy compounds which are aliphatic monoethers of polyoxyalkylene glycols. It is more particularly concerned with mixtures having relatively high average molecular weight, and comprising molecules containing polyoxyalkylene chains formed predominantly of the oxyethylene group, $-OC_2H_4-$, and the oxy 1,2-propylene group, $-OC_2H_3 \cdot CH_3-$. Such mixtures may result, for instance, from the reaction of monohydroxy aliphatic alcohols with alkylene oxide mixtures containing, for the most part, ethylene oxide and 1,2-propylene oxide. The invention includes novel mixtures of the monoethers, and methods of making such mixtures.

Polyoxyethylene glycols, $H(OC_2H_4)_xOH$, of relatively high molecular weight are known. These diols may be obtained by the addition of ethylene oxide, $C_2H_4O$, to water or to an ethylene glycol of lower molecular weight; for instance, ethylene glycol, diethylene glycol and the like. The resulting reaction products are believed to be complex mixtures of glycols of various molecular weights depending on the length of the polyoxyethylene chain, $-(OC_2H_4)_x-$, which is built up by the addition of the oxyethylene group, $-OC_2H_4-$, to the individual molecules. As far as is known to us, these addition products have not been resolved into identifiable constituents, except possibly in the case of readily distillable products of low molecular weight. Depending upon the molecular weight, the melting or fusion temperatures of these products are given as ranging from about $-50°$ to $10°$ C., for an average molecular weight of about 200–300, up to about 60 to 65° C., for an average molecular weight of about 3,000–4,000. At normal room temperatures, the polyoxyethylene glycols of an average molecular weight of about 600 to 800 have the consistency of a semi-fluid, pasty mass. Below this range of molecular weight the products are clear, colorless, normally-liquid compositions which are miscible with water in all proportions. At and above an average molecular weight of about 800–900, the polyoxyethylene glycols are low-melting, normally-solid compositions having fusion temperatures which increase with molecular weight from about 30° C. to a maximum of about 60° to 65° C. Polyoxyethylene glycols having fusion points above 60° to 65° C. have not been obtained, to our knowledge. The normally-solid polyoxyethylene glycols are said to be miscible with water in all proportions.

The average molecular weight of a glycol addition product of the kind referred to above, as determined by the ebullioscopic method or calculated from viscosity measurements or acetyl values, is often lower than that calculated from the amount of ethylene oxide entering into the reaction. The difference may be accounted for by a number of factors including the isomerization of ethylene oxide to acetaldehyde, side reactions arising out of the presence of aldehydes or other impurities in the reactants, and the starting of oxyethylene compounds of low molecular weight during the course of the addition reaction.

Complex mixtures such as result from the addition of ethylene oxide to a monohydroxy aliphatic alcohol, ROH, have also been made. Depending, to some extent, upon the particular monohydroxy alcohol which is the starting material and the average molecular weight of the addition product, the fusion temperatures and the water miscibility of the addition products do not differ greatly from the glycols. The higher the average molecular weight of the polyoxyethylene chain, the less appears to be the influence of the starting alcohol on such properties; addition products made from water-insoluble alcohols become more water-soluble with increasing molecular weight.

The average molecular weights of these addition products made from monohydroxy alcohols, calculated from the acetyl values, are likewise often lower than those obtained by ebullioscopic methods or from viscosity measurements, either of which may be lower than those calculated from the ethylene oxide reacted. This lack of agreement may be accounted for, at least in part, by the same factors as those mentioned in connection with the polyoxyethylene glycols. Also, the presence of polyoxyethylene glycols of low molecular weight in addition products formed from monohydroxy alcohols presumably brought about by traces of water in the alcohol or oxide, gives a disproportionately lower value for the apparent average molecular weight of the monoethers.

Although ethylene oxide addition products have been suggested for use as lubricants, their high melting or solidification temperatures make them unsuitable for use as metal lubricants where fluidity over a wide range of temperatures is required. As far as we are aware, there are no satisfactory solvents which will retain the polyoxyethylene glycols or their monoethers in solution at the sub-zero temperatures to which they may be subjected in service. In textile lubrication where they may be used in aqueous solution, there is a tendency for a diluent or solvent and a solid polyoxyethylene component to separate to an objectionable extent.

Prior disclosures with respect to the use of 1,2-propylene oxide for the formation of addition products fail to describe properties which permit identification of the products as true alcohols having one or more alcoholic hydroxyl groups, depending upon the number of hydroxyl groups in the starting material used.

We have found that useful and improved polyoxyalkylene products of relatively high average molecular weight, which are essentially mixtures of true monohydroxy alcohols, may be obtained by the addition, to a monohydroxy aliphatic alcohol, of a mixture of alkylene oxides containing ethylene oxide and 1,2-propylene oxide in an oxide ratio from 75–25 to 10–90 ethylene oxide-1,2-propylene oxide. By oxide ratio from 75–25 to 10–90 is meant that, in the oxide mixture which may be used in forming such monohydroxy alcohol addition product, the amount of 1,2-propylene oxide in the mixture is from one-third to nine times the amount of ethylene oxide present, by weight, the parts or proportion of the 1,2-propylene oxide being given last.

The reaction which takes place between the alcohol and the ethylene oxide and the 1,2-propylene oxide seems to be a simple addition wherein the alkylene oxide molecules undergo conversion to the corresponding oxyalkylene radicals as illustrated for any given molecule by the following general equation:

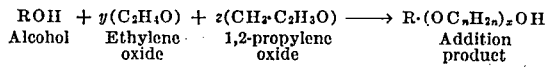

$$\underset{\text{Alcohol}}{\text{ROH}} + \underset{\substack{\text{Ethylene}\\\text{oxide}}}{y(C_2H_4O)} + \underset{\substack{\text{1,2-propylene}\\\text{oxide}}}{z(CH_3 \cdot C_2H_3O)} \longrightarrow \underset{\substack{\text{Addition}\\\text{product}}}{R \cdot (OC_nH_{2n})_x OH}$$

wherein ROH is an aliphatic monohydroxy alcohol; $y$ and $z$ represent the mols of ethylene oxide and 1,2-propylene oxide respectively; $n$ is both 2 and 3 in a single molecule, the total number of times $n$ has a value of 2 being equal to $y$ and the total number of times $n$ has a value of 3 being equal to $z$; and $x$ is the total number of such oxyalkylene groups, being equal to $y+z$.

From such properties as the average molecular weight, refractive index, density, viscosity, rate of change of viscosity with change in temperature, as well as upon theoretical considerations, it appears that these products are complex mixtures of monohydroxy polyoxyalkylene aliphatic monoethers having polyoxyalkylene chains of different lengths and different internal configurations with the hydroxyl group appearing at one end of the chain and the aliphatic group of the starting alcohol at the other, and containing in the single molecules both the oxyethylene group and the oxy 1,2-propylene group.

By way of illustration the molecular weights of the oxyethylene-oxy 1,2-propylene chains of compounds having five oxyalkylene groups to the molecule would be 234, 248, 262 and 276, respectively, exclusive of the alcohol, depending upon whether one, two, three or four oxy 1,2-propylene groups are present therein; and in a mixture of such compounds the average molecular weight attributable solely to the oxyalkylene chain would be between 234 and 276 with the oxide ratio corresponding thereto being between 75.2–24.8 and 15.9–84.1. Similarly, the molecular weights of the oxyethylene-oxy 1,2-propylene chains of compounds having six oxyethylene groups to the molecule with two, three, four and five oxy 1,2-propylene groups present therein would be 292, 306, 320 and 334, respectively; and in mixtures of such compounds the average molecular weight attributable solely to the oxyalkylene chain would be between 292 and 334 with an oxide ratio between 60.3–39.7 and 13.2–86.8 corresponding thereto. Compounds having a single oxypropylene group are omitted since their oxide ratio falls definitely above the 75–25 limit. In compounds having a total of seven oxyethylene and oxy 1,2-propylene groups to the molecule, of which the number of oxy 1,2-propylene groups are two, three, four, five and six, the molecular weight of the polyoxyalkylene chain would be 336, 350, 364, 378 and 392, respectively; and in mixtures of such compounds the average molecular weight attributable solely to the polyoxyalkylene chain would be between 336 and 392, with an oxide ratio between 65.5–34.5 and 11.2–88.8 corresponding thereto. Likewise, in compounds having two, three, four, five, six and seven oxy 1,2-propylene groups in an oxyethylene oxy 1,2-propylene chain of eight oxyalkylene groups, the molecular weights of such chains would be 380, 394, 408, 422, 436 and 450, respectively, with the average molecular weights attributable to the polyoxyalkylene chain in a mixture of such compounds being between 380 and 450, and the oxide ratio corresponding thereto being between 69.5–30.5 and 9.8–90.2. To each of the foregoing values for molecular weights and average molecular weights, there is to be added a value not less than 32, the molecular weight of methanol, the lowest member of the aliphatic alcohol series.

A product containing in admixture the monohydroxy aliphatic monoethers of the foregoing polyoxyalkylene chains, having proportions between 75–25 and 10–90, would have as many as nineteen constituents (exclusive of isomers) which differ from one another in the molecular weights attributable to the polyoxyalkylene chains yet which have a spread of only from five to eight oxyalkylene groups between the smallest and largest molecules, and a spread of from 266 to 482 in the molecular weights of the methyl monoethers. The complexity of the mixture may be due not only to the difference in molecular weights of the chains but also to the large number of isomers which may be formed by random (i. e., interspersed) distribution of the oxyethylene and oxy 1,2-propylene groups, with consequent variations in internal configuration from molecule to molecule, even among those of the same molecular weight. The complexity increases with molecular weight. Our novel products may be referred to as mixtures of monohydroxy heterized oxyethylene oxy 1,2-propylene aliphatic monoethers, and by the term "heterized" we mean that the monoethers vary in internal configuration from molecule to molecule, such variation arising out of a randomness of the distribution of the oxyethylene and the oxy 1,2-propylene groups therein, such as results, for instance, from the concurrent reaction of ethylene oxide and 1,2-propylene oxide with an aliphatic monohydroxy alcohol.

Using ethylene oxide-1,2-propylene oxide ratios from 75-25 to 10-90 by weight, and starting alcohols having one, two, three, four and more carbon atoms to the molecule, we have made a number of products having average molecular weights ranging from about 500 to upwards of 5,000. They may be obtained as normally liquid products which are characterized by having a relatively low rate of change of viscosity with change in temperature; the actual viscosity of the product as well as such other properties as density, refractive index and the like being dependent on the starting alcohol, the oxide ratio and the average molecular weight. For a given starting alcohol and oxide ratio, the viscosity, density and refractive index increase with molecular weight, and, for alcohols having from one up to fourteen or more carbon atoms and for oxide ratios from 75-25 to 10-90, the viscosities at a given temperature appear to lie in a relatively narrow band or zone which, at a temperature of 210° F., extends from 3 to 10 centistokes at average molecular weights of about 500 to 800, up to 20 to 50 centistokes at average molecular weights of about 1,500 to 2,000. For oxide ratios from 50-50 to 10-90, at a temperature of 20° F., the viscosities extend from 150 to 500 centistokes at average molecular weights of about 500 to 800, up to 1,500 to 5,000 centistokes at average molecular weights of 1,500 to 2,000.

Figure 2:
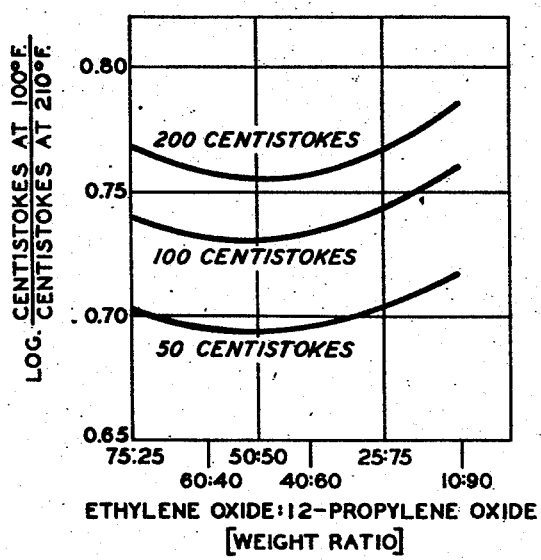

The products which we have found to have the lowest rate of change of viscosity with change in temperature are those made from ethylene oxide-1,2-propylene oxide ratios from 60-40 to 40-60. This characteristic is illustrated, in the case of the butanol series, by Figures 1 and 2. In Figure 1 the logarithm of the ratio of the viscosities, at temperatures of 100° F. and 210° F., respectively, is plotted against the viscosity at 100° F. of products made from oxide mixtures from 75-25 to 10-90, using butanol as the starting alcohol. As may be noted, over the greater part of the range, the curves for the butanol 60-40 products and the butanol 40-60 products lie below those for products having either a higher ethylene oxide content on the one hand, or a higher propylene oxide content on the other, for example, the butanol-75-25, butanol-25-75 and butanol-10-90 products. In Figure 2 the logarithm of the viscosity ratio, taken at the intercepts of the curves of Figure 1 with ordinates drawn at viscosities of 50, 100 and 200 centistokes, respectively, is plotted against the oxide ratio of products corresponding thereto. The effect of oxide ratio upon the rate of change in viscosity, for three values of viscosity at 100° F. is somewhat generally illustrated by the curves of Figure 2, which connect these points. In each of the three curves, the minimum rate of change with change in oxide ratio is shown to occur at ethylene oxide 1,2-propylene oxide ratios from 60-40 to 40-60, in the butanol series. The curve for the viscosity of 50 centistokes at 100° F. corresponds approximately to an average molecular weight, in this instance, between 800 to 1,000. Similarly, with other starting alcohols, curves may be drawn to depict the rate of change of viscosity with change in oxide ratio although the region of minimum rate of change, as well as the curves themselves, may be displaced somewhat, depending upon a number of factors; for instance, the particular alcohol.

In general, also, products made from oxide mixtures having a higher proportion of ethylene oxide than of propylene oxide exhibit a substantially greater degree of miscibility with water, or a greater water-tolerance, than those made from oxide mixtures containing a preponderance of 1,2-propylene oxide. By way of illustration, a butanol-50-50 product made by our preferred method, under water-free conditions using an alkali metal hydroxide as catalyst, is characterized by the unusual property of being miscible with cold water up to about 50 per cent or more of the product, by volume, and relatively immiscible with hot water. An aqueous solution containing about 50 per cent of such a product separates into two layers at temperatures of about 40° to 60° C. or higher. The one layer is a solution of water in the product and the other layer is a solution of the product in water. With increase in the 1,2-propylene oxide content the water-tolerance of the product decreases, and at an oxide ratio of 25-75, for instance, the products are substantially immiscible with water, even at low temperature; except possibly at low average molecular weights. On the other hand, products made from ethylene oxide-1,2-propylene oxide mixtures from 75-25 to 60-40 may require a temperature of about 95°-100° C. or even higher to cause the separation of two layers from aqueous solutions of the products, but the temperature at which separation may take place in any particular case will depend upon a number of factors including the average molecular weight, the starting alcohol, and to some extent, the conditions under which the product is made. Due largely to the difficulty of maintaining absolutely dry reaction conditions, our products may also have present in small amounts polyoxyalkylene glycols of lower molecular weight, of the order of about 500-600 or less, and the presence of these glycols may indicate an apparent water-miscibility of the product which is not truly characteristic of the monoethers of which it is essentially composed.

Products made from mixtures having oxide ratios from about 50-50 to 10-90 are also characterized by the very useful property of remaining in the fluid state at low temperatures, for instance, at temperatures as low as −50° C., and below. The temperature at which solidification of the product takes place increases with increase in ethylene oxide content above 50 per cent. Products made from mixtures having oxide ratios from 75-25 to 60-40 usually contain a solid phase at temperatures as high as 0° C. Even at temperatures above 10° C., presence of a solid or crystal phase may be observed by the haziness or cloudiness of the mixture, but the temperature at which solidification may take place in any particular case will here again depend upon a number of factors including the average molecular weight, the starting alcohol and to some extent, the conditions under which the product is made.

We have found that good results may be obtained in making the products by bringing the ethylene oxide-1,2-propylene oxide mixture into intimate contact with the monohydroxy alcohol starting material in a liquid phase throughout which a suitable catalyst is uniformly dispersed. For best results it is essential that the addition reaction be carried out under conditions which are closely controlled with respect to such factors as the amount of catalyst employed and the uniformity of its dispersion, the amount of unreacted alkylene oxides present at any stage during the reaction, the temperature maintained throughout the course of the reaction, and the intimacy and uniformity of contact of the reacting oxides with the reactants to which they are to be added.

As catalyst, sodium hydroxide or potassium hydroxide is preferred in an amount which is about 0.2 to 1.0 per cent by weight of the total amount of reactants, including the ethylene oxide and 1,2-propylene oxide appearing in the reaction product. An amount of active catalyst within this range is not so large as to cause excessive decomposition of the alkylene oxide addition product of the main reaction, and excellent results have been obtained with an amount of sodium hydroxide which is about 0.75 per cent by weight of the reactants. By active catalyst is meant the amount of catalyst present which has an alkalinity of the order of that of the alkali metal hydroxides, excluding such compounds of substantially lesser alkalinity as the carbonates and carboxylic acid salts which may be titratable as the hydroxide. Instead of the strongly alkaline hydroxides, the corresponding alcoholates may be used if desired. In general, the stronger the alkalinity of the catalyst, the less of it is required. All of the catalyst need not be added at the start of the reaction. If desired, a suitable amount may be added at the start, and the remainder of the catalyst added from time to time throughout the course of the reaction to maintain a substantially constant catalyst concentration.

Some conditions of reaction, as for instance a high reaction temperature, seem to favor the formation of glycols of low molecular weight, and any tendency toward glycol formation may become more pronounced the higher the reaction temperature. The oxyalkylene glycols thus formed are small in amount under our preferred reaction conditions, however, and may be removed by a subsequent treatment, as by distillation or extraction or both.

The reaction should be carried out at a temperature which is sufficiently high to favor rapid reaction of the alkylene oxides. A rapid reaction rate reduces the time of exposure of the oxide to the catalyst and the surfaces of the reaction vessel, and thus lessens the possibility of isomerizations and the formation of side-reaction products, particularly those side-reaction products which may be highly-colored. With our preferred alkaline catalysts, dry sodium hydroxide or potassium hydroxide or the corresponding alcoholates, we have successfully used reaction temperatures from about 80° C. to 160° C., and we have obtained substantially clear, uncolored products possessing excellent lubricating characteristics, which do not deposit sludge, gum- or lacquer-film-forming materials, or corrode metal parts when used as metal lubricants. Our best products were obtained with our preferred alkaline catalysts with the reaction temperature maintained at a temperature of about 100° to 130° C., and with a rate of addition of alkylene oxide mixture as hereinafter described.

It is also desirable, and even essential for best results, to avoid excessive concentration of unreacted alkylene oxides in the reaction zone, especially in the presence of such strongly alkaline catalysts as sodium hydroxide, potassium hydroxide, or the alkali metal alcoholates. We prefer to supply the ethylene oxide and 1,2-propylene oxide to the reaction zone at such a rate as to maintain a controlled concentration of unreacted oxides which is substantially uniform or constant up to the end of the addition reaction. To this end it is desirable to conduct the reaction in a closed system and to introduce the oxides at a rate which will maintain a substantially uniform pressure. Preferably, the pressure should be maintained at about 5 to 50 p. s. i., although under favorable conditions pressures as high as 200 p. s. i. may be used. A non-reactive gas, for instance nitrogen, may be used to assist in maintaining the pressure. (By the abbreviation or symbol p. s. i. as used herein is meant pounds per square inch, gauge.) We prefer also to cycle the liquid in the reaction vessel, or to agitate it vigorously, in order to wash the walls of the reaction vessel as well as to assist in maintaining intimate contact and a uniform concentration of the reactants. Because the presence of oxygen tends to favor the formation of side reaction products, the reaction vessel should be exhausted, or the air swept out with gaseous nitrogen or the like before charging the reactor.

For good stability of the monohydroxy heterized oxyethylene 1,2-propylene aliphatic monoether products used as metal lubricants, a low ash content is desirable to diminish or avoid sludge formation and deposition of carbon. The ash content of addition products may be derived from the catalyst used in making them, and also from any ash-forming inorganic impurities present in the reactants or acid substances present in the reaction mixture. By the absence or removal of low molecular weight glycols and the water associated therewith, the solubility of these ash-forming impurities, or substances which are determined as ash, is greatly decreased. Accordingly, the ash content of our products, particularly those made by the preferred method, may be reduced to provide metal lubricants of good stability.

For best control in making the addition products, we have found it desirable to carry out the oxide addition under relatively moisture-free conditions, and to avoid side reactions which form water. To dry the reaction vessels and connections, they may be swept out with dry, oxygen-free gas before introducing the charge. The catalyst should also be dry, or substantially so. The ethylene oxide and 1,2-propylene oxide should preferably be purified to remove moisture and any impurities which are capable of entering into side reactions which yield water. We have found that in order to produce compositions of superior stability and also to produce products having an average molecular weight of about 1,000 to 3,500 or higher, having only relatively small amounts of polyoxyalkylene glycols of molecular weight of about 500–600 and lower, it is desirable, and even essential for good results, that the moisture content of the oxides does not exceed about 0.1 per cent by weight. For best results where a low ash content and good stability are required, a moisture content not to exceed 0.05 per cent is desirable. It is recognized, however, that there may be a minimum amount or trace of moisture which is essential, and below which it is undesirable to go.

Alkylene oxides of the desired degree of dryness may be obtained by distilling them through an efficient rectifying column or from solution in a hygroscopic glycol or the like, for instance, ethylene glycol, diethylene glycol, propylene glycol or higher members of the glycol series. The oxide vapor may also be scrubbed by means of a hygroscopic liquid.

With such a strongly alkaline catalyst as sodium hydroxide, for instance, we prefer to neutralize the catalyst, upon completion of the reaction, with an acid which will react with the catalyst to form a salt having characteristics which favor its ready removal from the reaction product. To this end we have successfully used sulfuric acid and carbon dioxide. Preferably, the sulfuric acid is used in dilute aqueous solution. In neutralizing, it is desirable to form salts which are insoluble in the reaction product after stripping it of low boiling constituents, and which may be removed mechanically, as by filtering at a relatively high temperature.

Impurities other than inorganic salts which may be formed in the reaction products under some conditions may include, for instance, water-soluble materials which are not the monohydroxy aliphatic monoethers of the present invention. Because of the relatively high average molecular weight of our products, they cannot readily be distilled in ordinary vacuum equipment, and for the removal of water-soluble impurities it may be desirable to carry out an extraction step, preferably prior to the stripping operation. Water or an aqueous solution may be used as the extractant. Such an extraction may be carried out advantageously at a moderately elevated temperature from about 50° to 95° C., or higher, and under pressure, if need be, because of the decreased miscibility of the product with water and aqueous salt solution at such temperatures, especially with products of higher oxyethylene content. By way of illustration, a temperature of about 95° to 105° C. or higher may be required for the formation of two separate phases from an aqueous solution containing about 50 per cent of a product having an oxide ratio of 75-25, whereas at oxide ratios of about 25-75 the product has but limited miscibility at normal temperatures. In carrying out the extraction, we have found that the effect of sodium carbonate in favoring the formation of two phases is quite marked and that in many cases two phases may be formed at normal or room temperature by saturating the aqueous solution with sodium carbonate or potassium carbonate. When two phases are developed by heating or salting out, an appreciable amount of the monohydroxy addition product may remain in the water or extract phase. Some water may also remain in the raffinate phase. Upon adding a third component which is a solvent for the product, but a nonsolvent for water, the product-solvent phase will contain less water, and less product will be present in the extract phase. Solvents which are suitable as assistants in making the hot-water extractions are dichlordiethyl ether, dibutyl ether, butanol, hexanol, toluene, benzene, ethylene dichloride, and the like. By dissolving the product in such a solvent and washing the resultant solution at a temperature of about 95° to 98° C. with successive small portions of water, a substantially ash-free raffinate may be obtained with but slight loss of product. After removing the solvent from the raffinate or solvent-product phase, as by distillation, the residue may be stripped of low-boiling constituents by heating it under a reduced pressure which may be as low as about 1 or 2 millimeters of mercury and at an elevated temperature which may reach 180° C. or higher. The use of a solvent is especially suitable in extracting those products which do not readily form two phases on heating their aqueous solutions to about 100° C. Material appearing in the extract or aqueous phase may be recovered by removing the water, as by distillation, and filtering the residue to remove salt. When extraction is properly carried out, the stability of the raffinate and its freedom from corrosive action on metals are usually far superior to those of the extract.

The properties of the addition products made with catalysts other than alkali metal hydroxides may not be precisely the same as for the caustic catalyzed reaction. Boron trifluoride, for instance, may be used in making products having an average molecular weight up to about 1,000. Products having an average molecular weight above this value are not readily prepared with boron trifluoride as a catalyst, and, if so prepared, the products, though useful, have properties which differ from those of the caustic-catalyzed product which is preferred. In low concentrations boron trifluoride is also more active as a catalyst than sodium hydroxide, and an amount of the trifluoride which is about 0.15 to 0.5 per cent of the total weight of reactants may be used with good results. A uniform concentration of about 0.15 per cent is preferred. With this catalyst, reaction temperatures from about 50° to 130° C. have been used with good results, but a temperature of about 70° to 90° C. is preferred. In order to reduce the corrosive action of boron trifluoride on metal equipment, and also possibly to reduce side reactions, a small amount of calcium oxide may be added to the reactants. Upon completion of the reaction, the neutralization of the catalyst by adding lime in the presence of water results in the formation of salts which may be removed by filtering or extraction. In the case of boron trifluoride catalyzed product the removal of its fluorine content is highly desirable for good stability of the product to be used as a metal lubricant.

Used as lubricants, our new products are far superior to the alkylene oxide addition products that have been available in the past. We have found that our compositions will provide adequate lubrication in difficult applications where but imperfect lubrication is obtainable with even larger amounts of ordinary lubricants, such as animal, vegetable and mineral oils, their sulfonation products and the like. They are superior lubricants, we believe, because they possess to a high degree the property of wetting the surfaces to which they may be applied: metals, rubber, textiles and the like. The lubrication persists, moreover, because of the lack of evaporation, the resistance to oxidation, and the lack of gumming even at relatively high temperatures.

On textile fibers they produce a high quality lubrication and finish without a sulfonation step, and without the addition of the usual "oiliness" agents, heretofore employed with alkylene oxide addition products. In the lubrication of such natural textile fibers as wool, cotton, flax, hemp, and the like, it is believed that the persistence of the lubrication is due in large part, also, to the viscosity and the relatively large size of the molecules, which hinder the migration of the lubricant from the surface into the inner structure of the fibers. In the lubrication of synthetic fibers, our products serve also as finishing agents to give a more desirable "hand" to the fiber when the composition is permitted to remain thereon.

Because of the relatively higher water-miscibility of the monohydroxy oxyethylene oxy 1,2-propylene aliphatic monoethers made from oxide mixtures from about 75–25 to 50–50, they have advantages for use as textile lubricants, particularly in aqueous solutions. They are readily removed by scouring when used in woolen systems. As metal lubricants, they may be used with non-aqueous viscosity-reducing diluents, and those of high viscosity and high average molecular weight may be useful as mild extreme pressure lubricants, for instance in gear boxes.

Although at temperatures of 50° to 100° C. or higher all of the products made from mixtures having oxide ratios from 75–25 to 10–90 are characterized by a relatively low rate of change of viscosity with change in temperature, it is contemplated that the products obtainable with oxide ratios from about 50–50 to 10–90 will be especially useful as metal lubricants, pressure transmitting media and the like where fluidity, pumpability or freedom from crystallization at low temperatures are required.

The higher the average molecular weight the less is the influence of the starting alcohol upon the physical properties of the products, and accordingly the starting alcohols of higher average molecular weight may find greater use in products wherein the molecular weight attributable to the oxyalkylene chain may be twice or more the weight of the starting alcohol. For products of low viscosities those made from alcohols having up to ten carbon atoms to the molecule appear to have the better viscosity-temperature relationships and are preferred.

The invention may be further illustrated by the following examples:

EXAMPLE 1

Twenty pounds of butyl alcohol were charged into a suitable reaction vessel and 0.9 pound of powdered sodium hydroxide was dissolved or suspended therein. Forty-seven and one-half pounds of ethylene oxide and 47.5 pounds of 1,2-propylene oxide, uniformly admixed, were introduced into the reactor over a period of 1.4 hours, at a pressure of about 25 p. s. i. The moisture content of the mixed alkylene oxides was about 0.2 per cent by weight. The reaction mixture was vigorously agitated and maintained at a temperature of about 107° C. throughout the reaction. After neutralization of the product with aqueous sulfuric acid (1:1 by volume), it was stripped of water and low boiling substances to an end temperature of 180° C. at a reduced pressure as low as 2 millimeters. The hot residue was filtered while at a temperature of about 180° C. to remove the insoluble salts. The resulting product had the following viscosities:

| Temperature, °F. | Saybolt Seconds | Centistokes |
| --- | --- | --- |
| 210 | 39.5 | 4.0 |
| 100 | 96 | 19.6 |
| 70 | 182 | 39.5 |

The pour point was below −60° F., and the flash point above 350° F.

A typical raffinate obtainable in about 80–85 per yield by hot water extraction of the product had the following properties: density at 210° F., 0.9683; refractive index, 20/D, 1.4529; viscosity at 210° F., 6.4 centistokes.

The stripped fluid and the raffinate were found to possess exceptionally desirable properties for a single-component hydraulic fluid. In addition, the product possessed suitable properties as a non-volatile, viscosity-reducing diluent for the viscous, high molecular weight polyoxyalkylene glycols of the type which result from the coreaction of a mixture of ethylene and 1,2-propylene oxides with various monoalkylene glycols and polyoxyalkylene glycols of low molecular weight.

EXAMPLE 2

Ten pounds of butanol were charged into a reactor as in Example 1. Six hundred and sixty-six pounds of mixed oxides, containing 500 pounds of ethylene oxide and 166 pounds of 1,2-propylene oxide, were introduced into the reactor over a period of 27 hours, and 5.4 pounds of powdered sodium hydroxide were added during the course of the reaction. The pressure was maintained at about 15 to 30 p. s. i. and the temperature at about 110° C. After all the oxides had been added, the product was neutralized, stripped and hot-filtered as described in Example 1. The stripped product had a pour point below 0° C. and a flash point above 300° C. It showed desirable properties as a lubricant.

EXAMPLE 3

Fifteen and one-half pounds of dry butanol were charged into a reactor which had been swept out with dry oxygen-free nitrogen, and 0.18 pound of boron trifluoride was dissolved or dispersed in the butanol. Ninety-four and one-half pounds of mixed oxides, containing 47.25 pounds of ethylene oxide and 47.25 pounds of 1,2-propylene oxide, were introduced into the reactor over a period of 3.2 hours. Each of the oxides was dried just prior to use, and the mixture had a moisture content of not more than about 0.07 per cent by weight. The pressure was maintained at about 5 to 9 p. s. i. and the temperature at about 58° C. to 69° C. After all the alkylene oxides had been added the product was diluted with about 20 pounds of water, and the boron trifluoride catalyst rendered inactive by this dilution with water and the addition of about 2 pounds of calcium oxide.

The reaction product, thus treated, was stripped of water, low boiling components, and other material which could be distilled off at a kettle temperature of about 145° C. and at a pressure of about 2 millimeters.

The reaction product was then further stripped with steam at a kettle temperature of about 185° C. at atmospheric pressure. After stripping, the hot reaction product was filtered while at a temperature of about 180° C. to remove insoluble salts and suspended matter. About fifty per cent of the fluid thus processed was distillable at a kettle temperature of about 277° C. and at a pressure of about 0.2 to 0.3 millimeters. The stripped fluid prior to distillation, the distillate, and the residue were found, respectively, to have the following properties:

Table A

| Temperature | Stripped Fluid | | Distillate | | Residue | |
|---|---|---|---|---|---|---|
| | Saybolt Seconds | Centistokes | Saybolt Seconds | Centistokes | Saybolt Seconds | Centistokes |
| 210° F | 40.5 | 4.35 | 36 | 2.9 | 47.5 | 6.6 |
| 130° F | 66.5 | 14.4 | 50.7 | 11 | 92.6 | 20 |
| 100° F | 98 | 20.1 | 69.3 | 12.9 | 151.2 | 32.3 |

ABSOLUTE DENSITY

| | | |  | | | |
|---|---|---|---|---|---|---|
| 20° C | | 1.0165 | | 1.0050 | | 1.0315 |
| 50° C | | 0.9935 | | 0.9775 | | 1.0090 |
| 90° C | | 0.9630 | | 0.9470 | | 0.9790 |
| Flash Point ° F | | 372 | | 325 | | 431 |
| Fire Point ° F | | 410 | | 356 | | 466 |
| Pour Point ° F | | −72.4 | | −96 | | −69 |
| Moistures per cent | | 0.129 | | 0.01 | | 0.01 |
| Ash do | | 0.002 | | 0.000 | | 0.004 |
| Bromine Number [1] | | 0.382 | | 0.07 | | 0.09 |
| Average Molecular Weight: | | | | | | |
| Ebullioscopically | | 462 | | 381 | | 605 |
| By acetylation | | 477 | | | | |
| Total Acidity calculated as acetic acid per cent | | <0.2 | | <0.2 | | <0.2 |

[1] Grams of bromine per 100 grams of substance.

The above properties of the distillate and residue, taken in comparision with the properties of the stripped fluid prior to distillation, illustrate the excellent heat stability of the product. The density and viscosity of the residue may differ slightly from those of a product prepared from the same reactants, using an alkali metal hydroxide as catalyst. The compositions of which this example is representative, however, have utility as lubricants for metals, rubber and textile fibers. They do not attack natural rubber and do not corrode metals. They are satisfactory as hydraulic fluids and find utility also as components in those type of multiple component hydraulic fluids which do not contain mineral oil.

Example 4

Dry ethanol was reacted with a mixture of dry ethylene oxide and dry 1,2-propylene oxide having an oxide ratio of 50–50, using a powdered anhydrous sodium hydroxide catalyst substantially as described in Examples 1 and 2. There was obtained a composition having a density of 0.9707 at 210° F.; a refractive index of 1.4506 at 20° F.; and viscosity of 39 Saybolt seconds (3.88 centistokes) at 210° F., and 83.5 Saybolt seconds (16.60 centistokes) at 100° F. This product had a flash point of about 374° F., and a pour point of about −60° F. It had desirable lubricating properties for metal surfaces, and was suitable for use as a hydraulic fluid.

Example 5

Two hundred and twenty-two parts by weight of dry isobutanol containing ten parts of boron trifluoride and thirty parts of finely powdered calcium oxide were reacted with a mixture of alkylene oxides containing 639 parts of dry ethylene oxide and a like amount of dry 1,2-propylene oxide. The reaction was conducted over a three hour period at approximately 50° C. and at substantially atmospheric pressure. A slight positive pressure was maintained in the reaction vessel to exclude air, and the reactor contents were continually agitated. At the completion of the reaction, 150 parts of water were added to the reaction product and the agitation continued at 50° C. for one and one-half hours. The reaction product was then stripped of low boiling constituents, including water, distilling at a kettle temperature as high as 180° C. and a reduced pressure as low as 2 millimeters. The stripping of the lower boiling ends from the reaction product was completed by blowing dry carbon dioxide gas through the reaction product for a period of three-fourths hour while maintaining a temperature of 180° C. The hot residue was filtered at a temperature of about 180° C. This stripped fluid had a flash point of 362° F., a pour point of about −59° C., a water content of 0.055 per cent by weight, a viscosity of 40.2 Saybolt seconds (4.3 centistokes) at 210° F., and 98 Saybolt seconds (20.1 centistokes) at 100° F. It had a density of 0.9667 at 210° F. and a refractive index (20/D) of 1.4492.

A raffinate obtained by hot water extraction of the stripped fluid had a density at 210° F. of 0.9505; a refractive index (20/D) of 1.4490 and a viscosity at 210° F. of 4.16 centistokes.

Both the stripped fluid and the raffinate were good lubricants for metal surfaces and useful as hydraulic fluids generally.

Example 6

By a procedure essentially the same as described in Example 5, a fluid was made by reacting 160 parts of dry methanol containing 10 parts of boron trifluoride catalyst and 30 parts of calcium oxide with 1,463 parts of a mixture of dry oxides containing 75 per cent ethylene oxide and 25 per cent 1,2-propylene oxide by weight. The stripped fluid had a flash point of 326° F., a pour point of about −45° C., an ash content of 0.034 per cent by weight, and a water content of 0.116 per cent by weight. In this instance the Saybolt viscosity of the stripped fluid was 38.8 seconds (3.81 centistokes) at 210° F., and 89 seconds (17.96 centistokes) at 100° F.

Example 7

A reaction product prepared from butanol and a mixture of equal amounts of dry ethylene oxide and dry 1,2-propylene oxide, and treated to obtain the stripped fluid substantially as described in Example 3, was extracted with hot water. Five volumes of water per volume of fluid product were used for the extraction at a temperature of about 98° C. The raffinate obtained on extraction amounted to about 60–70 per cent of the stripped fluid. The properties of the stripped fluid and of the raffinate are given in the following table:

*Table B*

| Temperature | Stripped Fluid | | Raffinate | |
|---|---|---|---|---|
| | Saybolt Seconds | Centistokes | Saybolt Seconds | Centistokes |
| 210° F | 40.2 | 4.26 | 36.6 | 3.11 |
| 100° F | 94.0 | 19.17 | 68.5 | 12.7 |
| 0° F | 1,900 | 414 | 1,000 | 218 |

ABSOLUTE DENSITY

| | | |
|---|---|---|
| 210° F. (98.89° C.) | 0.9551 | 0.9258 |
| 130° F. (54.44° C.) | 0.9896 | 0.9605 |
| 77° F. (25° C.) | 1.0127 | 0.9840 |
| Average Molecular Weight: | | |
| By acetylation | 400 | 529 |
| By ebullioscopy | 449 | |
| Water Content ___per cent__ | 0.16 | 0.11 |
| Ash Content ___do___ | 0.04 | 0.05 |
| Pour Point ___° C__ | −67 | |
| Flash Point ___° F__ | 371 | |

EXAMPLE 8

The product of this example was prepared, treated and extracted with hot water in substantially the same way as the composition of Example 7 except that a larger amount of the mixed oxides was reacted with the butanol in preparing the composition. The raffinate obtained on extraction was about 67 per cent of the stripped fluid. The properties of the stripped fluid and the raffinate are given in the table which follows:

*Table C*

| Temperature | Stripped Fluid | | Raffinate | |
|---|---|---|---|---|
| | Saybolt Seconds | Centistokes | Saybolt Seconds | Centistokes |
| 210° F | 54.5 | 8.6 | 46.1 | 6.1 |
| 100° F | 211 | 45.6 | 137.6 | 29 |
| 0° F | 4,900 | 1,070 | 2,180 | 475 |

ABSOLUTE DENSITY

| | | |
|---|---|---|
| 77° F. (25° C.) | 1.0340 | 1.0175 |
| 130° F. (54.44° C.) | 1.0114 | 0.9947 |
| 210° F. (93.99° C.) | 0.9773 | 0.9605 |
| Average Molecular Weight: | | |
| By acetylation | 429 | 646 |
| By ebullioscopy | 526 | |
| Water Content ___per cent__ | 0.085 | 0.09 |
| Ash Content ___do___ | 0.035 | 0.026 |
| Pour Point ___° C__ | −50 | |
| Flash Point ___° F__ | 365 | |

The raffinates of Examples 7 and 8 are useful as unitary hydraulic fluids and metal lubricants. The values for viscosity and density of the raffinates, as given in Tables B and C, show that these compositions possess characteristics which are desirable in hydraulic fluids.

EXAMPLE 9

*Step 1.*—Ninety-four and four-tenths parts by weight of a mixture of equal amounts of ethylene oxide and 1,2-propylene oxide were introduced into fifteen and one-half parts by weight of tetradecanol containing one part of powdered sodium hydroxide dispersed therein. The temperature was maintained at about 115° C. and the oxide mixture was introduced into the tetradecanol at such a rate that the pressure was maintained at about 26 p. s. i. over a period of about three hours. A part of the reaction product was neutralized with dilute sulfuric acid (1:1), stripped and filtered. The filtrate had a specific gravity at 20° C./20° C. of 1.026, a refractive index (20/D) of 1.4582, a flash point of about 340° F., and a viscosity of 500 Saybolt Universal seconds (108 centistokes) at 100° F.

*Step 2.*—To forty parts by weight of the unneutralized reaction product of Step 1 of this example was added 0.5 part by weight of powdered sodium hydroxide, followed by 70 parts by weight of a mixture of equal parts of ethylene oxide and 1,2-propylene oxide. The temperature was maintained at 113° C. during the reaction, and the oxide mixture supplied at such a rate as to maintain a pressure of about 22 p. s. i. The reaction time was about two hours. The reaction product of this step was neutralized with dilute sulfuric acid (1:1), stripped and filtered. The stripped fluid had a flash point of about 425° F., and a specific gravity at 20° C./20° C. of 1.050. The viscosity at 100° F. was about 1,100 Saybolt Universal seconds (238 centistokes).

The water content of the tetradecanol used in Step 1 was not more than 0.06 per cent by weight, and the oxides of Steps 1 and 2, which in each instance were freshly dried, contained not more than 0.09 per cent by weight of water.

The products of Steps 1 and 2 were completely soluble in water at about 20° C., and insoluble or only slightly soluble in water at a temperature of about 95° C. Water solutions of these products showed considerable foaming on agitation. The products of both Steps 1 and 2 also had good lubricating qualities and were suitable as hydraulic fluids in heavy duty recoil mechanisms of the type used in artillery. These products were also useful as base lubricants in hydraulic fluids of lower viscosities on dilution by suitable diluents such as may be obtained in accordance with Example 1, for instance.

In addition to the products of which the foregoing examples are illustrative, a large number of products have been made over a range of oxide mixtures from 75–25 to 10–90, and with different starting alcohols, using as catalyst the sodium alcoholate of the starting alcohol. Table D summarizes some of the properties of these products.

In each series of products tabulated under the starting alcohol and oxide ratio, the product of lower average molecular weight as specified therein served as the starting material for making the product of next higher average molecular weight, except for the members of lowest average molecular weight where the starting material was the alcohol itself.

The values for the average molecular weights appearing in the first column beginning at the left were determined ebullioscopically according to the Menzies-Wright procedure described in the Journal of the American Chemical Society, volume 43, pages 2309 to 2314 (1921).

Table D

| Average Mol. Wt. | | Density, 210° F. | Refractive Index, 20° C/D | Flash Temperature, ° F. | Viscosity, Centistokes | | | Cloud Point, ° F. |
|---|---|---|---|---|---|---|---|---|
| Menzies-Wright | Acetyl Value | | | | 210° F. | 100° F. | 0° F. | |
| BUTANOL—75-25 | | | | | | | | |
| -------- | 577 | 0.9615 | 1.4552 | 401 | 5.75 | 26.4 | -------- | 26.6 |
| -------- | 735 | 0.9921 | 1.4577 | 428 | 7.98 | 38.2 | -------- | 30.2 |
| -------- | 1,204 | 1.0086 | 1.4618 | 460 | 15.7 | 85.9 | -------- | 37.4 |
| 1,400 | 1,365 | 1.0141 | 1.4628 | 464 | 20.5 | 111.5 | -------- | 39.2 |
| -------- | 1,885 | 1.0194 | 1.4640 | 473 | 32.5 | 187 | -------- | 48.2 |
| 1,915 | 2,360 | 1.0237 | 1.4650 | 482 | 45.6 | 271 | -------- | 46.4 |
| 1,950 | 2,255 | 1.0256 | 1.4654 | 473 | 53.9 | 320 | -------- | 59.0 |
| BUTANOL—60-40 | | | | | | | | |
| 580 | 506 | 0.9708 | 1.4536 | 410 | 6.19 | 28.3 | 808 | -------- |
| 1,180 | 1,243 | 0.9893 | 1.4585 | 446 | 15.78 | 83.0 | 3,272 | -------- |
| -------- | 1,543 | 0.9989 | 1.4597 | 446 | 22.4 | 124.3 | 5,405 | -------- |
| -------- | 2,134 | 1.0039 | 1.4615 | 455 | 43.1 | 251.7 | 13,043 | -------- |
| 1,745 | 1,815 | 1.0056 | 1.4620 | 464 | 43.5 | 252.9 | Crystals | -------- |
| METHANOL—50-50 | | | | | | | | |
| 500 | 541 | 0.9770 | 1.4517 | 392 | 5.19 | 23.2 | 793 | -------- |
| -------- | 895 | 0.9869 | 1.4558 | 441 | 9.75 | 40.2 | 1,487 | -------- |
| -------- | 1,127 | 0.9911 | 1.4581 | 455 | 13.9 | 73.0 | 3,020 | -------- |
| 1,535 | 1,673 | 0.9954 | 1.4587 | 460 | 26.3 | 149.5 | 7,400 | -------- |
| -------- | 2,155 | 0.9978 | 1.4601 | 464 | 44.6 | 258.0 | 13,600 | -------- |
| 2,110 | 2,197 | 0.9994 | 1.4607 | 464 | 45.7 | 276.5 | 14,780 | -------- |
| BUTANOL—50-50 | | | | | | | | |
| 467 | 466 | 0.9451 | 1.4481 | 347 | 3.88 | 16.47 | 362 | -------- |
| 825 | 840 | 0.9691 | 1.4542 | 437 | 8.42 | 40.68 | 1,291 | -------- |
| 995 | 1,019 | 0.9756 | 1.4558 | 437 | 11.31 | 56.88 | 2,330 | -------- |
| 1,300 | 1,397 | 0.9856 | 1.4578 | 459 | 17.10 | 90.83 | 3,836 | -------- |
| 1,700 | 1,790 | 0.9909 | 1.4588 | 464 | 26.0 | 143.7 | 6,930 | -------- |
| 2,000 | 2,008 | 0.9937 | 1.4596 | 459 | 32.6 | 183.0 | 8,800 | -------- |
| 2,425 | 2,545 | 0.9944 | 1.4599 | 466 | 48.1 | 278.5 | 14,600 | -------- |
| 2,800 | 2,770 | 0.9951 | 1.4600 | 457 | 65.0 | 384 | 21,180 | -------- |
| 2,900 | 2,855 | 0.9966 | 1.4604 | 453 | 70.5 | 434 | 25,800 | -------- |
| TETRADECANOL—50-50 | | | | | | | | |
| -------- | 1,224 | 0.9453 | 1.4571 | 365 | 18.6 | 104.8 | 5,260 | -------- |
| -------- | 1,635 | 0.9701 | 1.4586 | 419 | 28.5 | 164.8 | 8,800 | -------- |
| -------- | 2,055 | 0.9773 | 1.4589 | 446 | 39.3 | 234 | 12,700 | -------- |
| -------- | 2,192 | 0.9816 | 1.4593 | 455 | 47.1 | 280 | 15,640 | -------- |
| -------- | 2,375 | 0.9831 | 1.4600 | 455 | 58.9 | 358 | 20,850 | -------- |
| BUTANOL—25-75 | | | | | | | | |
| 520 | 537 | 0.9334 | 1.4482 | 369 | 4.4 | 19.2 | 514.6 | -------- |
| 925 | 963 | 0.9539 | 1.4512 | 437 | 10.3 | 52.5 | 2,085 | -------- |
| 1,215 | 1,161 | 0.9589 | 1.4529 | 446 | 14.4 | 77.6 | 3,292 | -------- |
| 1,415 | 1,402 | 0.9629 | 1.4534 | 451 | 19.9 | 112 | 5,445 | -------- |
| 1,637 | 1,647 | 0.9661 | 1.4540 | 455 | 27.7 | 163 | 8,639 | -------- |
| 1,775 | 1,754 | 0.9677 | 1.4547 | 460 | 30.0 | 181.2 | 9,520 | -------- |
| 1,900 | 1,850 | 0.9691 | 1.4550 | 446 | 39.2 | 231.9 | 13,376 | -------- |
| 1,900 | 1,852 | 0.9699 | 1.4552 | 459 | 39.4 | 239.5 | 13,800 | -------- |
| BUTANOL—10-90 | | | | | | | | |
| -------- | 586 | 0.9222 | 1.4448 | 383 | 4.7 | 21.4 | 622 | -------- |
| 1,025 | 1,021 | 0.9393 | 1.4489 | 441 | 10.3 | 54.3 | 2,452 | -------- |
| -------- | 1,446 | 0.9456 | 1.4507 | 446 | 16.7 | 95.4 | 5,193 | -------- |
| -------- | 1,547 | 0.9473 | 1.4512 | 437 | 19.8 | 115.1 | 6,285 | -------- |
| -------- | 1,635 | 0.9487 | 1.4519 | 446 | 23.2 | 134.7 | 7,830 | -------- |
| 1,850 | 1,808 | 0.9511 | 1.4521 | 455 | 29.2 | 174.6 | 10,833 | -------- |
| 1,700 | 1,925 | 0.9518 | 1.4524 | 446 | 35.5 | 215.1 | 13,676 | -------- |

These values are considered to be typical for average molecular weights up to about 1,500. The values for average molecular weights appearing in column 2 were calculated from the acetyl values of the products and are based upon the assumption that each molecule of the product contains but one hydroxyl group.

The tetradecanol used in the preparation of the tetradecanol addition products described herein consisted essentially of the branched chain secondary alcohol, 7-ethyl-2-methylundecanol-4.

The terms "product" and "addition product," as used herein, are intended to include the mixtures of the invention by whatever method or process they may be produced or made. It is contemplated that they may be made by methods other than the addition of a mixture of ethylene oxide and 1,2-propylene oxide to an aliphatic alcohol, as, for instance, from the corresponding dihydroxy oxyethylene oxy 1,2-propylene products, by alkylation at one of the hydroxyl groups thereof.

Also, the term "monohydroxy heterized oxyethylene oxy 1,2-propylene aliphatic monoether product" is intended to include products which may be made by the addition of mixtures of ethylene oxide and 1,2-propylene oxide to the monohydroxy aliphatic alcohols which are mono aliphatic ethers of such glycols as ethylene glycol, propylene glycol, diethylene glycol, dipropylene glycol and the like.

Unless otherwise specified, the values for average molecular weights given herein have been determined by acetyl values.

This application is in part a continuation of applications Serial No. 399,948 and Serial No. 351,152, filed June 26, 1941, and August 3, 1940, respectively.

The invention is susceptible of modification within the scope of the appended claims.

We claim:

1. A mixture of monohydroxy oxyethylene oxy 1,2-propylene aliphatic monoethers in which ethylene oxide and 1,2-propylene oxide are combined therein as oxyethylene and oxy 1,2-propylene groups in a ratio which is at least one-third part of 1,2-propylene oxide for each part of ethylene oxide by weight, said mixture having an average molecular weight of at least 500 of which at least 300 is attributable to the oxyethylene and oxy 1,2-propylene groups, exclusive of the aliphatic monoether group, the aliphatic monoethers of said mixture containing in a single molecule both the oxyethylene group and the oxy 1,2-propylene group.

2. A mixture of monohydroxy oxyethylene oxy 1,2-propylene aliphatic monoethers in which the aliphatic monoether group has from one to ten carbon atoms and in which ethylene oxide and 1,2-propylene oxide are combined therein as oxyethylene and oxy 1,2-propylene groups in a ratio which is at least one-third part of 1,2-propylene oxide for each part of ethylene oxide by weight, said mixture having an average molecular weight of at least 500, the aliphatic monoethers of said mixture containing in a single molecule both the oxyethylene group and the oxy 1,2-propylene group.

3. A mixture of monohydroxy oxyethylene oxy 1,2-propylene butyl monoethers in which ethylene oxide and 1,2-propylene oxide are combined therein as oxyethylene and oxy 1,2-propylene groups in the ratio of at least one-third part of 1,2-propylene oxide for each part of ethylene oxide by weight, said mixture having an average molecular weight of at least 500, the butyl monoethers of said mixture containing in a single molecule both the oxyethylene group and the oxy 1,2-propylene group.

4. A mixture of monohydroxy oxyethylene oxy 1,2-propylene aliphatic monoethers in which ethylene oxide and 1,2-propylene oxide are combined therein as oxyethylene and oxy 1,2-propylene groups in a ratio which is from one-third part to nine parts of 1,2-propylene oxide for each part of ethylene oxide by weight, said mixture having an average molecular weight of at least 500 of which at least 300 is attributable to the oxyethylene and oxy 1,2-propylene groups, exclusive of the aliphatic monoether group, the aliphatic monoethers of said mixture containing in a single molecule both the oxyethylene group and the oxy 1,2-propylene group.

5. A mixture of monohydroxy oxyethylene oxy 1,2-propylene aliphatic monoethers in which ethylene oxide and 1,2-propylene oxide are combined therein as oxyethylene and oxy 1,2-propylene groups in a ratio from one-third part to about nine parts of 1,2-propylene oxide for each part of ethylene oxide, by weight, said mixture having an average molecular weight of at least 500, as determined by acetyl value, said average molecular weight being such that the weight attributable to the oxyethylene and oxy 1,2-propylene groups is at least 650 for the mixtures having about nine parts of 1,2-propylene oxide for each part of ethylene oxide and at least 300 for mixtures having the lower 1,2-propylene oxide ratios, exclusive of the weight attributable to the aliphatic monoether group, and the monoethers of said mixture containing in a single molecule both the oxyethylene group and the oxy 1,2-propylene group.

6. A mixture of monohydroxy oxyethylene oxy 1,2-propylene aliphatic monoethers in which the aliphatic monoether group has from one to ten carbon atoms and in which ethylene oxide and 1,2-propylene oxide are combined therein as oxyethylene and oxy 1,2-propylene groups in a ratio from one-third part to about nine parts of 1,2-propylene oxide for each part of ethylene oxide, by weight, said mixture having an average molecular weight of at least 500, as determined by acetyl value, the average molecular weight being such that the weight attributable to the oxyethylene and oxy 1,2-propylene groups is at least 650 for mixtures having about nine parts of 1,2-propylene oxide for each part of ethylene oxide, exclusive of the weight attributable to the aliphatic monoether group, and the monoethers of said mixture containing in a single molecule both the oxyethylene group and the oxy 1,2-propylene group.

7. A mixture of monohydroxy oxyethylene oxy 1,2-propylene alkyl monoethers in which ethylene oxide and 1,2-propylene oxide are combined therein as oxyethylene and oxy 1,2-propylene groups in a ratio from one-third part to one part of 1,2-propylene oxide for each part of ethylene oxide, by weight, said mixture having an average molecular weight of at least 500 as determined by acetyl value, and such that the weight attributable to the oxyethylene and oxy 1,2-propylene groups is at least 300, exclusive of the weight attributable to the alkyl monoether group, and the monoethers of said mixture containing in a single molecule both the oxyethylene group and the oxy 1,2-propylene group.

8. A mixture of monohydroxy oxyethylene oxy 1,2-propylene aliphatic monoethers having an average molecular weight, by acetyl value, of at least 900 in which ethylene oxide and 1,2-propylene oxide are combined therein as oxyethylene and oxy 1,2-propylene groups in a ratio which is at least one part of 1,2-propylene oxide for each part of ethylene oxide, by weight, the monoethers of said mixture containing in a single molecule both the oxyethylene group and the oxy 1,2-propylene group.

9. A mixture of monohydroxy oxyethylene oxy 1,2-propylene aliphatic monoethers having an average molecular weight of at least 900 in which ethylene oxide and 1,2-propylene oxide are combined therein as oxyethylene and oxy 1,2-propylene groups in a ratio from one part to nine parts of 1,2-propylene oxide for each part of ethylene oxide, by weight, the monoethers of said mixture containing in a single molecule both the oxyethylene group and the oxy 1,2-propylene group.

10. A mixture of monohydroxy oxyethylene oxy 1,2-propylene alkyl monoethers having from one to ten carbon atoms in the alkyl monoether group and an average molecular weight of at least 900 in which ethylene oxide and 1,2-propylene oxide are combined therein as oxyethylene and oxy 1,2-propylene groups in a ratio from one part to nine parts of 1,2-propylene oxide for each part of ethylene oxide, by weight, the monoethers of said mixture containing in a single molecule both the oxyethylene group and the oxy 1,2-propylene group.

11. A mixture of monohydroxy oxyethylene oxy 1,2-propylene butyl monoethers having an average molecular weight of at least 900 in which ethylene oxide and 1,2-propylene oxide are combined therein as oxyethylene and oxy 1,2-propylene groups in a ratio from one part to nine parts of 1,2-propylene oxide for each part of ethylene oxide, by weight, the monoethers of said mixture containing in a single molecule both the oxyethylene and the oxy 1,2-propylene group.

12. A mixture of monohydroxy oxyethylene oxy 1,2-propylene alkyl monoethers in which ethylene oxide and 1,2-propylene oxide are combined therein as oxyethylene and oxy 1,2-propylene groups in a ratio which is from one to about nine parts of 1,2-propylene oxide for each part of ethylene oxide by weight, said mixture having an average molecular weight from about 900 to 5,000, the alkyl monoethers of said mixture containing in a single molecule both the oxyethylene group and the oxy 1,2-propylene group.

13. A method of making a mixture of monohydroxy oxyethylene oxy 1,2-propylene aliphatic monoethers which comprises adding a substantially aldehyde-free and water-free mixture of ethylene oxide and 1,2-propylene oxide to an aliphatic monohydroxy alcohol under substantially anhydrous conditions, in an amount which is at least six mols of said oxides per mol of alcohol, said oxides being present in said mixture in a ratio of at least one-third part of 1,2-propylene oxide for each part by weight of ethylene oxide and said mixture being added at such rate as to maintain a substantially uniform concentration of unreacted oxide in the reaction zone while maintaining the reaction mixture at a temperature of about 80° to 160° C. and at a pressure of about 5 to 50 p. s. i.

14. A method of making a mixture of monohydroxy oxyethylene oxy 1,2-propylene aliphatic monoethers which comprises adding a substantially aldehyde-free and water-free mixture of ethylene oxide and 1,2-propylene oxide to an aliphatic monohydroxy alcohol under substantially anhydrous conditions, in an amount which is at least six mols of said oxides per mol of alcohol, said oxides being present in said mixture in a ratio of one-third part to about nine parts of 1,2-propylene oxide for each part by weight of ethylene oxide and said mixture being added at such rate as to maintain a substantially uniform concentration of unreacted oxide in the reaction zone while maintaining the reaction mixture at a temperature of about 80° to 160° C. and at a pressure of about 5 to 50 p. s. i.

15. A method of making a mixture of monohydroxy oxyethylene oxy 1,2-propylene alkyl monoethers in which the alkyl monoether group has from one to ten carbon atoms which comprises adding a substantially aldehyde-free and water-free mixture of ethylene oxide and 1,2-propylene oxide to an alkanol containing from one to ten carbon atoms to the molecule under substantially anhydrous conditions, in an amount which is at least six mols of said oxides per mol of alkanol, said oxides being present in said mixture in a ratio of one-third part to about nine parts of 1,2-propylene oxide for each part by weight of ethylene oxide and said mixture being added at such rate as to maintain a substantially uniform concentration of unreacted oxide in the reaction zone while maintaining the reaction mixture at a temperature of about 80° to 160° C. and at a pressure of about 5 to 50 p. s. i.

16. A method of making a mixture of monohydroxy oxyethylene oxy 1,2-propylene alkyl monoethers which comprises adding a substantially aldehyde-free and water-free mixture of ethylene oxide and 1,2-propylene oxide to an aliphatic monohydroxy alcohol under substantially anhydrous conditions, in an amount which is at least six mols of said oxides per mol of alcohol and in the presence of one of the group consisting of sodium hydroxide, potassium hydroxide and their alcoholates in an amount, as the hydroxide, which is from about 0.1 to 1.0 per cent of the total weight of the reactants, said oxides being present in said mixture in a ratio of at least one-third part of 1,2-propylene oxide for each part of ethylene oxide by weight; said mixture being added at such rate as to maintain a substantially uniform concentration of unreacted oxide in the reaction zone while maintaining the reaction mixture at a temperature of about 80° to 160° C. and at a pressure of about 5 to 50 p. s. i.; thereafter neutralizing the catalyst with an inorganic oxy acid and extracting the reaction product with water to remove water-soluble organic and inorganic substances therefrom, and stripping the reaction product of constituents distillable at a temperature up to about 180° C. and a pressure down to about 2 millimeters.

17. A mixture of monohydroxy oxyethyleneoxy 1,2-propylene aliphatic monoethers having from one to ten carbon atoms in the aliphatic monoether group and having an average molecular weight of at least 500 in which ethylene oxide and 1,2-propylene oxide are combined therein as oxyethylene and oxy 1,2-propylene groups in a ratio from at least one-third to about one part of propylene oxide for each part of ethylene oxide, by weight, the monoethers of said mixture containing in a single molecule both the oxyethylene group and the oxy 1,2-propylene group.

18. A mixture of monohydroxy oxyethyleneoxy 1,2-propylene aliphatic monoethers having from one to ten carbon atoms in the aliphatic monoether group and having an average molecular weight of at least 800 in which ethylene oxide and 1,2-propylene oxide are combined therein as oxyethylene and oxy 1,2-propylene groups in a ratio from about two-thirds to one and one-half parts of propylene oxide for each part of ethylene oxide, by weight, the monoethers of said mixture containing in a single molecule both the oxyethylene group and the 1,2-oxypropylene group.

FREDERICK H. ROBERTS.
HARVEY R. FIFE.

REFERENCES CITED

The following references are of record in the file of this patent:

UNITED STATES PATENTS

| Number | Name | Date |
| --- | --- | --- |
| 1,633,927 | Davidson | June 28, 1927 |
| 1,921,378 | Webel | Aug. 8, 1933 |
| 2,213,477 | Steindorff | Sept. 3, 1940 |

FOREIGN PATENTS

| Number | Country | Date |
| --- | --- | --- |
| 317,770 | Great Britain | Aug. 19, 1929 |